(12) United States Patent
Ozugur et al.

(10) Patent No.: US 7,941,752 B2
(45) Date of Patent: May 10, 2011

(54) SYSTEM AND METHOD FOR REPRESENTATION OF USER PREFERENCE AND POLICY IN CONTACT LIST

(75) Inventors: Timucin Ozugur, Fairview, TX (US); Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 655 days.

(21) Appl. No.: 11/282,144

(22) Filed: Nov. 18, 2005

(65) Prior Publication Data

US 2007/0118809 A1    May 24, 2007

(51) Int. Cl.
 *G06F 3/00* (2006.01)
(52) U.S. Cl. ........ 715/739; 715/736; 715/741; 715/753; 715/765; 715/810; 715/835; 709/204; 709/206; 709/207; 709/224; 379/90.01; 379/93.01; 379/93.09; 379/93.11
(58) Field of Classification Search .................... 715/739
See application file for complete search history.

(56) References Cited

U.S. PATENT DOCUMENTS

| | | | | |
|---|---|---|---|---|
| 5,500,929 | A * | 3/1996 | Dickinson | 715/853 |
| 5,808,610 | A * | 9/1998 | Benson et al. | 715/788 |
| 6,526,129 | B1 * | 2/2003 | Beaton et al. | 379/90.01 |
| 6,678,719 | B1 * | 1/2004 | Stimmel | 709/204 |
| 7,035,923 | B1 * | 4/2006 | Yoakum et al. | 709/224 |
| 7,069,259 | B2 * | 6/2006 | Horvitz et al. | 706/25 |
| 7,117,445 | B2 * | 10/2006 | Berger | 715/752 |
| 7,206,388 | B2 * | 4/2007 | Diacakis | 379/88.03 |
| 7,298,833 | B2 * | 11/2007 | Klein et al. | 379/201.02 |
| 2002/0075304 | A1 | 6/2002 | Thompson et al. | |
| 2003/0046296 | A1 * | 3/2003 | Doss et al. | 707/102 |
| 2003/0105820 | A1 * | 6/2003 | Haims et al. | 709/205 |
| 2003/0208545 | A1 * | 11/2003 | Eaton et al. | 709/206 |
| 2004/0059781 | A1 * | 3/2004 | Yoakum et al. | 709/204 |
| 2004/0158609 | A1 * | 8/2004 | Daniell et al. | 709/206 |
| 2004/0243941 | A1 | 12/2004 | Fish | |
| 2005/0084082 | A1 * | 4/2005 | Horvitz et al. | 379/114.06 |
| 2006/0004911 | A1 * | 1/2006 | Becker et al. | 709/207 |
| 2006/0031370 | A1 | 2/2006 | Lyle et al. | |
| 2006/0075091 | A1 * | 4/2006 | Beyda et al. | 709/224 |

FOREIGN PATENT DOCUMENTS

| WO | 0237812 A2 | 5/2002 |
|---|---|---|
| WO | 02063486 A1 | 8/2002 |

OTHER PUBLICATIONS

EchoEcho.com, "HTML Forms: Drop Down Menu", Oct. 31, 2004, NetKontoret, pp. 1-4.*

* cited by examiner

*Primary Examiner* — Alvin H Tan
(74) *Attorney, Agent, or Firm* — Garlick, Harrison & Markison, LLP

(57) ABSTRACT

System and method for representing preference and policy in a contact list are described. One embodiment is a graphical user interface ("GUI") for displaying a directory of contacts of a user. The GUI comprises a list of contacts displayed in a first window of the GUI; for each contact in the list of contacts, a preference and policy category for the contact, wherein the preference and policy category for the contact is displayed in the first window of the GUI; and for each contact in the list of contacts, a feature icon indicative of whether a feature is enabled for the contact according to the preference and policy category for the contact, wherein the feature icon is displayed in association with the contact in the first window of the GUI.

23 Claims, 10 Drawing Sheets

US 7,941,752 B2

SYSTEM AND METHOD FOR REPRESENTATION OF USER PREFERENCE AND POLICY IN CONTACT LIST

CROSS-REFERENCE TO RELATED APPLICATION(S)

This application discloses subject matter related to the subject matter disclosed in the following commonly owned provisional patent application Ser. No. 60/738,296: "SYSTEM AND METHOD FOR REPRESENTATION OF RICH PRESENCE FOR EACH CONTACT IN A CONTACT LIST", filed even date herewith, in the name(s) of: Timucin Ozugur and Jack Jachner, which is hereby incorporated by reference.

BACKGROUND OF THE INVENTION

1. Technical Field of the Invention

The present invention generally relates to contact lists. More particularly, and not by way of any limitation, the present invention is directed to system and method for representation of a user's selected preference and policy in connection with contacts in a contact list.

2. Description of Related Art

With today's widespread use of the Internet as a primary communication medium, data communication devices have been designed that are capable of communicating over packet-switched networks. For instance, telephones, pagers, personal digital assistant devices, cell phones, handheld computers, and fax machines can be accessed and controlled via the Internet. Communication over a packet-switched network using communication devices that traditionally communicate over a circuit-switched telecommunications network is generally known as network telephony, or IP telephony when an IP network is involved.

Various types of user communication devices (e.g., a cell phone, laptop or handheld PC, desktop PC, and the like) can identify themselves to the network using a suitable identifier (e.g., username@company.com). "Presence" refers to, for example, the availability, proximity, activity level, or operating state of a presentity, such as a user, object, or anything that can have some kind of state. Presence can be loosely defined as knowledge about a presentity that is displayed to a watcher. Status information about the presentity's communication and other conditions is collected by various methods and devices for aggregation and processing or by a presence engine in order to transform the raw data into some useful form for the watcher.

The ability for users or objects to monitor each other's presence is a feature offered in connection with many applications that support network telephony. For example, instant messaging ("IM") applications have a buddy list or contact list feature, in which a user of the application can determine whether select users or objects are available for engaging in communication. The data retrieved and returned to the contact list, e.g., "John OFFLINE" or "Susan ONLINE", is referred to as "presence information," and is generally maintained by a presence server in the data network, which is often a dedicated server. Typically, the presence server supports network telephony protocols such as Session Initiation Protocol (SIP). Users or objects can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as a "watcher" or "subscriber") and the second device user (or "presentity") to facilitate the communication of the presentity's presence information to the watcher.

Additional details about presence and presence modeling are set forth in the Internet Engineering Task Force (IETF) Request for Comment (RFC) 2778 entitled "A model for Presence and Instant Messaging," dated February 2002; RFC 2779 entitled "Instant Messaging/Presence Protocol Requirements," dated February 2002; and Internet-Draft identified as <<draft-schulzrinne-simple-rpids-01.ps>> and entitled "RPIDS—Rich Presence Information Data Format for Presence Based on the Session Initiation Protocol (SIP)," dated Feb. 18, 2003, which are incorporated herein by reference.

Presence information is conventionally displayed as a one-dimensional contact list that indicates the presence status (e.g., ONLINE or OFFLINE) of the user and one or more "buddies" or contacts. When the user selects a preference for a contact, the selected preference is not displayed on the list. For example, the user may prefer that a particular contact be able to reach him while he is at home. This can be accomplished by enabling a "find-me/follow-me" ("FMFM") feature for a contact in the preferences for that contact. However, if this preference setting is not conspicuously and constantly displayed in connection with the contact list, the user may not realize that the preference has not been set appropriately and the contact will not be able automatically to reach the user.

Currently, a main menu option (such as "Tools") is used to set preferences and policies in connection with the user's contact list. By nature, setting up preferences/policies using the main menu requires the user to make a series of selections via an input device, so it is not a particularly good solution for instant communications when the user needs to set up a communications channel instantaneously. Additionally, after the selections are made, a similar series of selections will need to be made to determine the current preference/policy settings for a given contact or group of contacts in the contact list.

SUMMARY OF THE INVENTION

One embodiment is a graphical user interface ("GUI") for displaying a directory of contacts of a user. The GUI comprises a list of contacts displayed in a first window of the GUI; for each contact in the list of contacts, a preference and policy category for the contact, wherein the preference and policy category for the contact is displayed in the first window of the GUI; and for each contact in the list of contacts, a feature icon indicative of whether a feature is enabled for the contact according to the preference and policy category for the contact, wherein the feature icon is displayed in association with the contact in the first window of the GUI.

Another embodiment is a method of displaying a directory of contacts of a user using a GUI. The method comprises displaying in a first window of the GUI a list of contacts; for each contact in the list of contacts, displaying in a first window of the GUI a preference and policy category for the contact; and for each contact in the list of contacts, displaying in a first window of the GUI a feature icon indicative of whether a feature is enabled for the contact according to the preference and policy category for the contact.

Another embodiment is a method for organizing contact information in a directory. The method comprises displaying a list of contacts within a first window of a directory application; displaying for each contact an icon associated with a preference and policy category for the contact within the first window of the directory application; and displaying for each contact authorized actions corresponding to the preference and policy category for the contact within the first window of the directory application.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
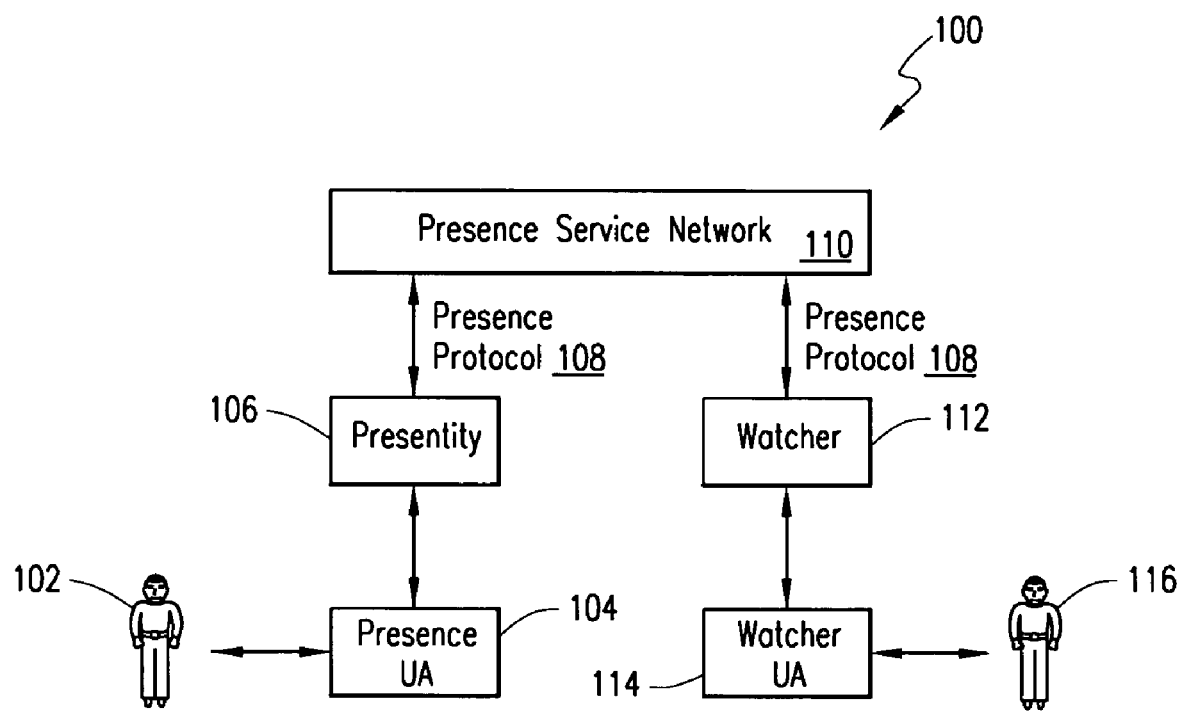
FIG. 1 depicts a conventional presence application system.

Embodiments of the invention will now be described with reference to various examples of how the invention can best be made and used. Like reference numerals are used throughout the description and several views of the drawings to indicate like or corresponding parts, wherein the various elements are not necessarily drawn to scale.

Referring now to the drawings, and more particularly to FIG. 1, depicted therein is a conventional presence application system 100 where a Sender Principal 102 interfaces with a presence user agent (UA) 104 for transmitting presence information regarding a presentity 106. An application-specific presence protocol 108 is used for providing presence information to a presence service network (PSN) 110 that is embodied as an IP-based communications network. At the other end of transmission, a watcher 112 obtains the presence information using the presence protocol 108, which is provided to a Receiver Principal 116 who interfaces with a watcher user agent (UA) 114 for controlling the watcher 112.

Figure 2:
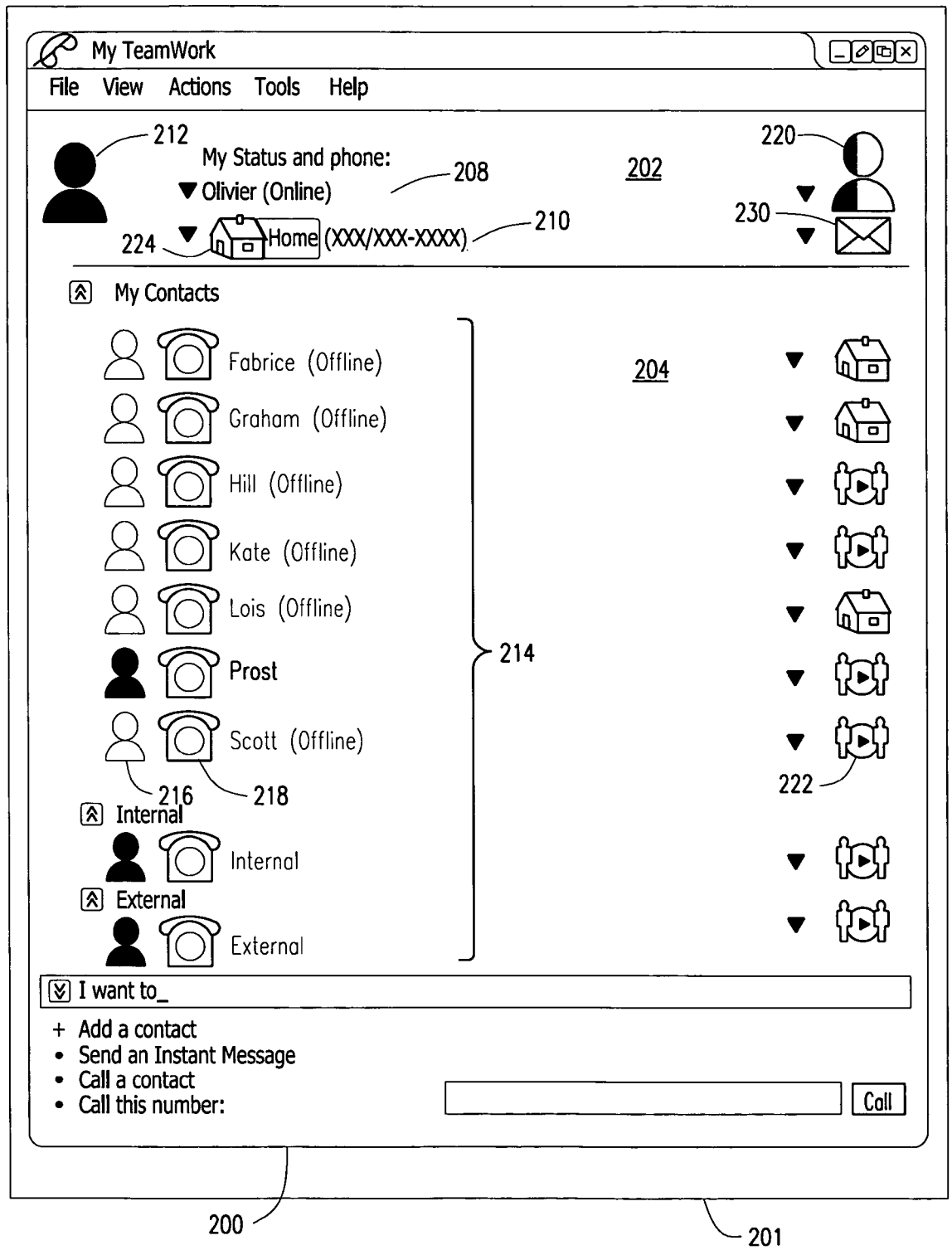
FIG. 2 illustrates a contact list page as displayed on a communications device of a user in accordance with one embodiment.

FIG. 2 illustrates a contact list page 200 as displayed on a communications device 201 of a user in accordance with one embodiment. In one embodiment, the communications device 201 comprises a handheld communications device, although it will be recognized that the embodiments described herein may be implemented using any number of different types of communications devices. As shown in FIG. 2, the contact list page 200 includes a user status section 202 and a contact status section 204. The user status section 202 includes a name 208 of the user, contact information 210 for the user, and a user presence icon 212, the appearance of which corresponds to the presence status of the user as presented to one or more watchers. For example, in the embodiment illustrated in FIG. 2, the user presence icon 212 is a first color if the presence status of the user is ONLINE (or AVAILABLE) and a second color if the presence status of the user is OFFLINE (or UNAVAILABLE).

The contact status section 204 includes a contact list 214 comprising the names of one or more contacts or contact groups (e.g., "Internal" and "External"), which may also be watchers of the user. The term "contact" will hereinafter be used to refer to an individual contact, as well as a contact group.

Each name in the list 214 has associated therewith a contact presence icon 216, the appearance of which corresponds to the presence status of the contact as presented to one or more watchers. For example, in the embodiment illustrated in FIG. 2, the contact presence icon 216 is a first color if the presence status of the contact with which it is associated is ONLINE (or AVAILABLE) and a second color if the presence status of the contact with which it is associated is OFFLINE (or UNAVAILABLE).

Each contact in the contact list 214 also has associated therewith a contact information type icon 218 that indicates the type of phone number that is provided for the associated contact. The contact information type icon 218 indicates whether the phone number provided for the contact is a home number, an office number, a mobile number, or some other type of number.

As illustrated in FIG. 2, in accordance with one embodiment, the user status section 202 includes an icon 220 indicating a preference level of the user with respect to certain features. For purposes of example, the FMFM feature described above will be used to explain this aspect of the embodiment and the importance of being able to display the users preference and policy; however, it will be recognized that preference and policy may be set and displayed in a similar manner for other available features and management of communications events as well. In one embodiment, the preference level selected by the user is not broadcast to watchers.

Contacts for which the FMFM feature is enabled will have their calls to the user automatically redirected to the contact number indicated in the contact information 210 for the user. As will be described in greater detail hereinbelow, the FMFM feature for each contact in the contact list 214 is enabled or not according to the preference level selected by the user, as visually persistently indicated by the icon 220, and a VIP level of the contact as set by the user. An icon 222 associated with each contact in the contact list 214 indicates the preference and policy category for the contact, which in the illustrated embodiment indicates whether the FMFM feature is enabled for the associated contact. The appearance of the icon 222 associated with a contact for which the FMFM feature has been enabled will be identical to an icon 224 associated with the contact information 210 indicated in the user presence section 202.

Figure 3:
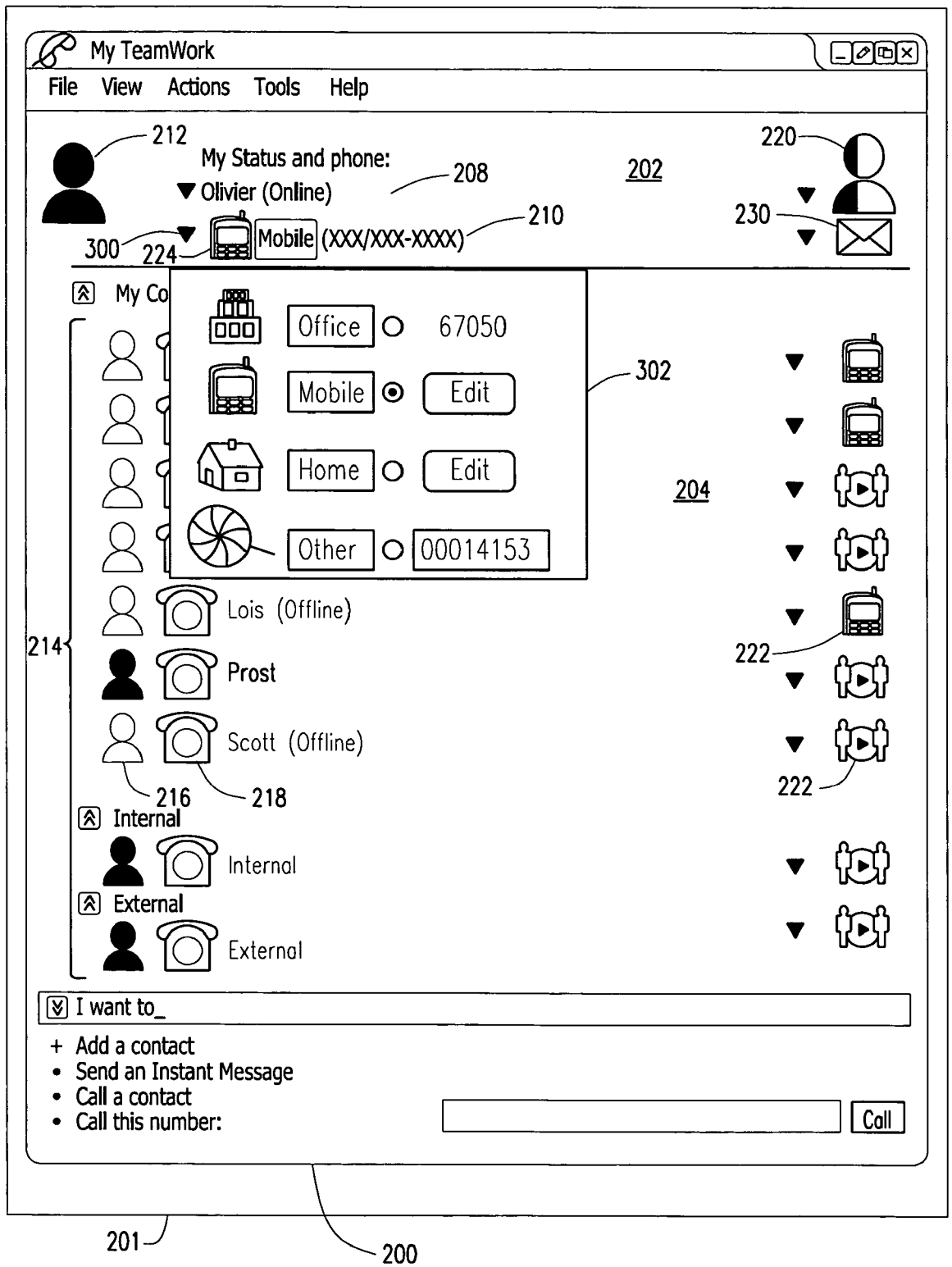
FIG. 3 illustrates a change in the number to which contacts of the user for which a FMFM feature has been enabled will be directed in accordance with one embodiment.

As illustrated in FIG. 3, the user can change the number to which calls from contacts for whom the FMFM feature is enabled will be automatically redirected by clicking on an arrow 300, which results in the display of a menu 302. Using the menu 302, the user can select any one of a number of different contact options. For example, the illustrated options include "Office", "Mobile", "Home", and "Other". As illustrated in FIG. 3, selection of a different contact option results in a change of appearance of the icon 224. As a result, the appearance of each of the icons 222 associated with contacts for which the FMFM feature is enabled is automatically updated accordingly.

Figure 4:
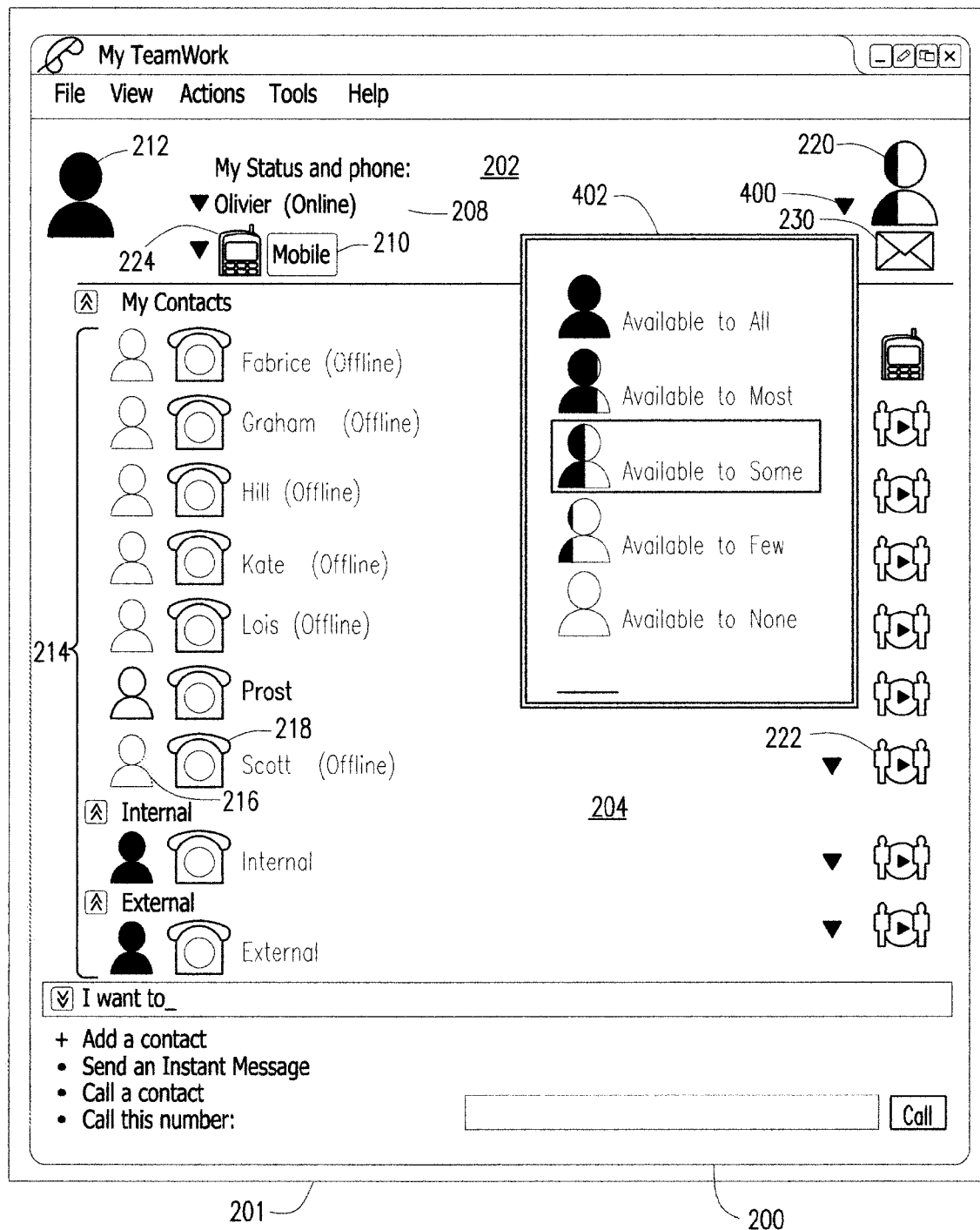
FIG. 4 illustrates a change in preference level of the user in accordance with one embodiment.

FIG. 4 illustrates changing of the preference level of the user. To change his or her preference level, the user clicks on an arrow 400 associated with the icon 220, resulting in display of a menu 402 comprising a list of available preference levels. In one embodiment, the preference levels include "Available to All", "Available to Most", "Available to Some", "Available to Few", and "Available to None." Once the user selects a preference level, the appearance of the icon 220 is updated to visually indicate the currently selected preference level. In one embodiment, the icon 220 is a first color when "Available to All" is selected, a second color when "Available to None" is selected, and some of the first and second colors when one of the remaining levels is selected. In particular, when the selected level is "Available to Most", ¾ of the icon 220 will be the first color and ¼ of the icon will be the second color; when the selected level is "Available to Some", ½ of the icon 220 will be the first color and ½ of the icon will be the second color; when the selected level is "Available to Few", ¼ of the icon 220 will be the first color and ¾ of the icon will be the second color.

Figure 5:
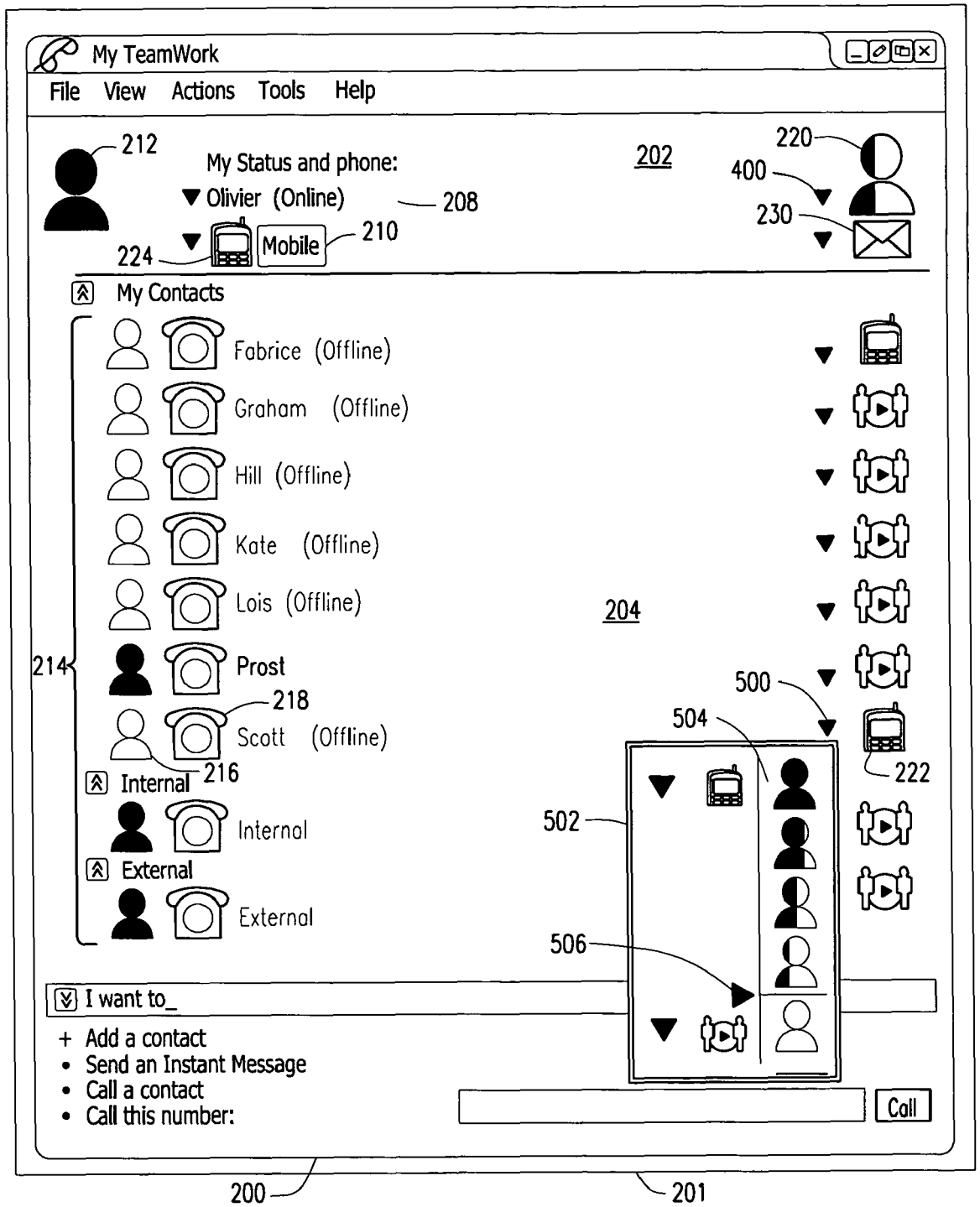
FIG. 5 illustrates a change in a VIP level of a contact of the user in accordance with one embodiment.

FIG. 5 illustrates changing of the VIP level of a contact. To change the VIP level of a contact, the user clicks on an arrow 500 associated with the contact, resulting in display of a menu 502 comprising a plurality of icons 504, the appearance of each of which corresponds to one of the available preference levels of the user as set forth above. Using the menu 502, the user moves a slide 506 to a position on the menu 502 to set the VIP level of the contact. In particular, so long as the preference level of the user, as indicated by the icon 220, is set to a level that is above the position of the slide 506 on the menu 502, the preference and policy category of the user will be such that the FMFM feature for the contact will be enabled. In contrast, if the preference level of the user, as indicated by the icon 220, is set to a level that is below the position of the slide 506 on the menu 502, the FMFM feature will not be enabled for the contact. In the example illustrated in FIG. 5, the VIP level of the contact "Scott" is set such that, so long as the user preference level is set to any level above "Available to None", the FMFM feature will be enabled for "Scott" and the appearance of the icon 222 displayed in connection with that "Scott" will be identical to the appearance of the icon 224.

Figure 6:
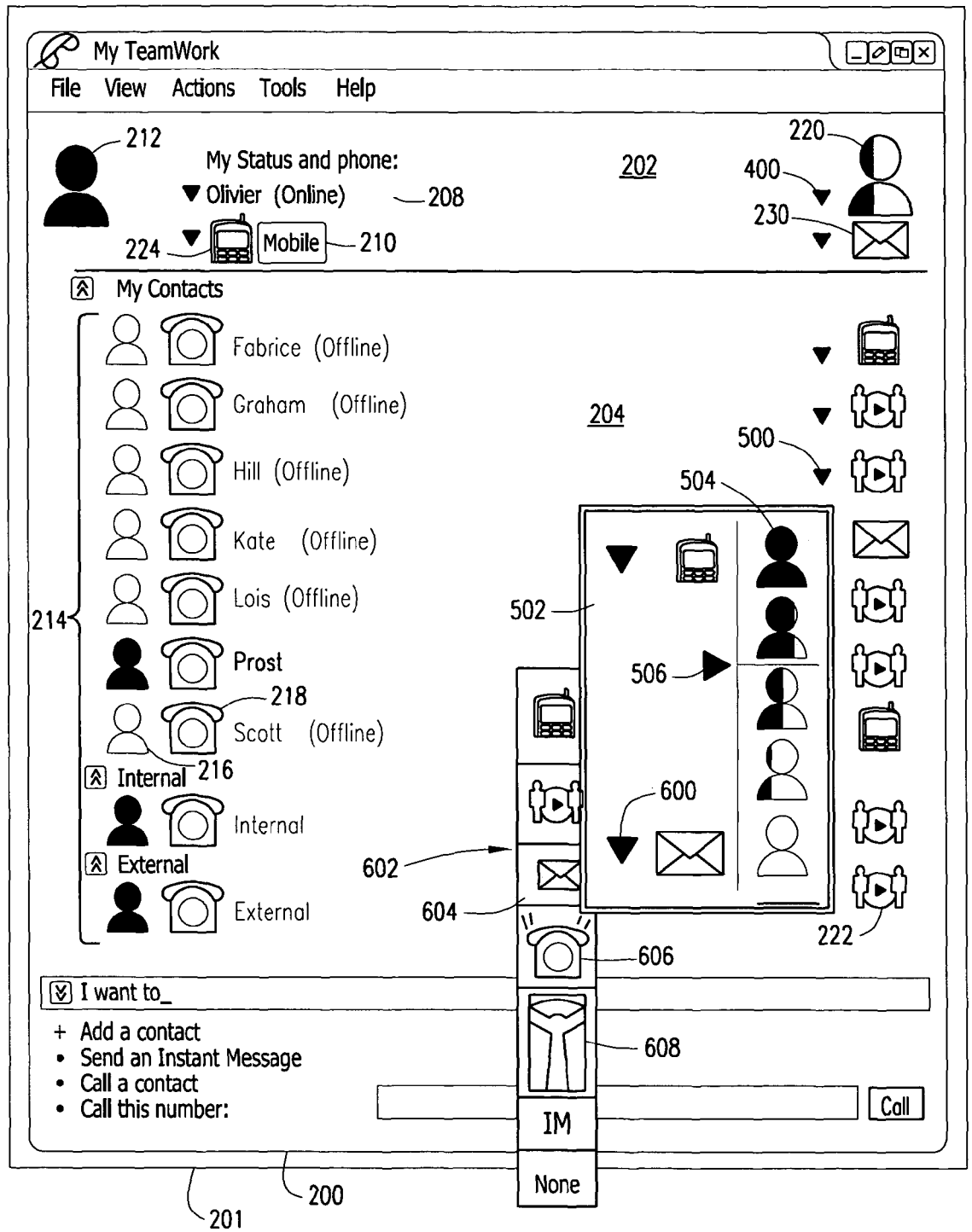
FIG. 6 illustrates a change in an option of a VIP level of a contact of the user in accordance with one embodiment.

Referring now to FIG. 6, clicking on an arrow 600 in the menu 502 results in the display of another menu 602 comprising a set of icons representing options for handling communications events initiated by contacts for which the FMFM feature is not enabled. For example, selection of an icon 604 would result in the contact being connected to a voice mailbox when the user is not available and the FMFM feature is not enabled. Selection of an icon 606 would result in the phone ringing non-stop when the user is not available and the FMFM feature is not enabled. Selection of an icon 608 would result in the contact being connected with an instant assistant feature when the user is not available and the FMFM feature is not enabled.

In the example illustrated in FIG. 6, the VIP option of the VIP level of a contact "Kate" is set such that, when the user is unavailable, calls from that contact will be directed to the user's voice mail box.

Figure 7:
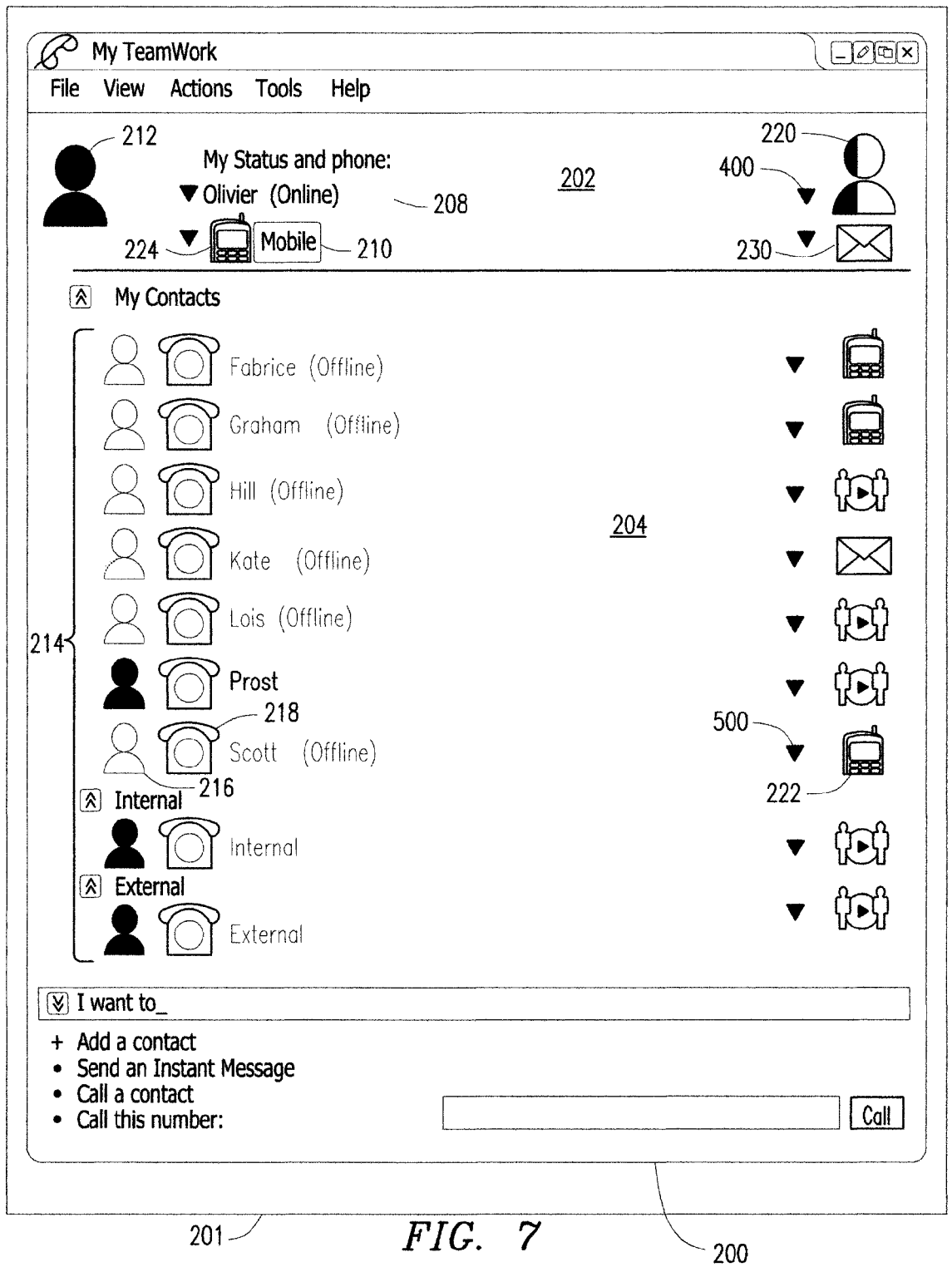
FIG. 7 illustrates the effect of the changes illustrated in FIGS. 5 and 6 on the contact list page of FIG. 2.

FIG. 7 illustrates the appearance of the contact list page 201 after the VIP level of "Scott" has been changed, as described above with reference to FIG. 5, and the VIP option of a VIP level of a contact "Kate" has been changed, as described above with reference to FIG. 6. As previously noted, the term "contact" as used herein includes contact groups. Two such contact groups may be "Internal", which will be defined herein to include all persons employed by the entity that employs the user, and "External", which will be defined herein to include all persons not included in the "Internal" contact group. In one embodiment, individual contact VIP level and options will take precedence over any group contact VIP level and options for the same caller. For example, if a caller who is part of the Internal contact group is also individually specified in the contact list, the preference and policy category selected for the individual, rather than that selected for the Internal contact group, will apply to a call from that caller.

Referring again to FIG. 7, an overflow options icon 230 indicates what will happen in "exceptional cases" if an unexpected communications event (e.g., telephony, IM, or some other event) occurs. For example, assume one of the contacts in the contact list 200 for which the FMFM feature is enabled calls the user at his office. Because the FMFM feature is enabled, the call is redirected to the user's mobile phone. Assume further that the user's mobile phone, when the call from the contact is redirected thereto, is busy. This is an "exceptional case" that is handled as indicated by the overflow options icon 230. In the illustrated example, the icon 230 indicates that the call will go into the user's office voice mailbox.

Figure 8:
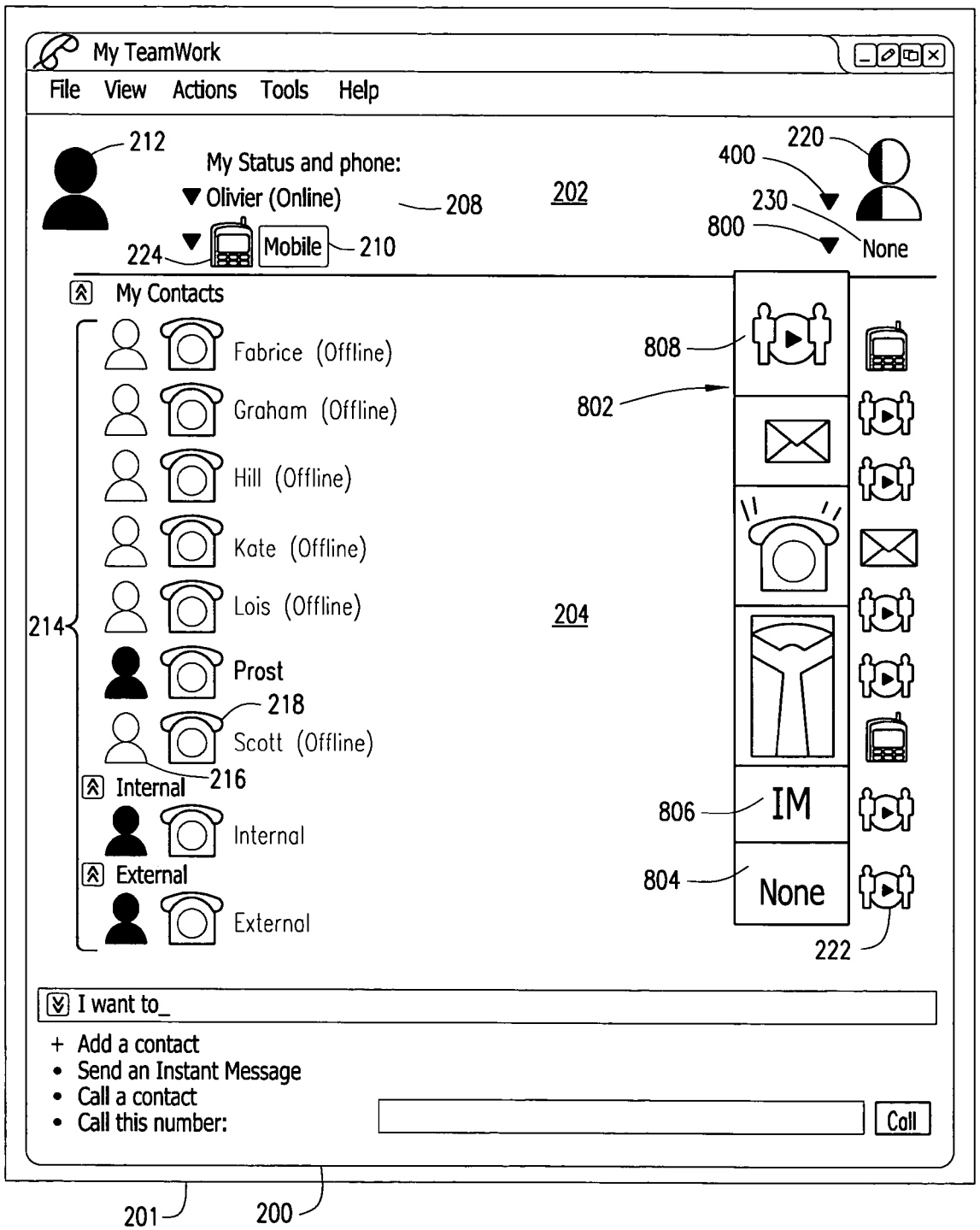
FIG. 8 illustrates a change in overflow options exercised in connection with exceptional cases in accordance with one embodiment.

FIG. 8 illustrates how an overflow option for handling exceptional cases may be selected. As illustrated in FIG. 8, clicking on an arrow 800 associated with the overflow options icon 210 results in display of a menu 802. The menu 802 is similar, if not identical, to the menu 602 and comprises a set of icons representing overflow options that can be selected for handling exceptional cases. For example, selection of an icon 804 would result in the phone not being rung and no action being taken in response to an exceptional case. Selection of an icon 806 would result in the caller being connected to an instant messaging application in response to an exceptional case. Selection of an icon 808 would result in the caller being connected with a designated third party (e.g., the user's assistant), in response to an exceptional case.

Figure 9B:
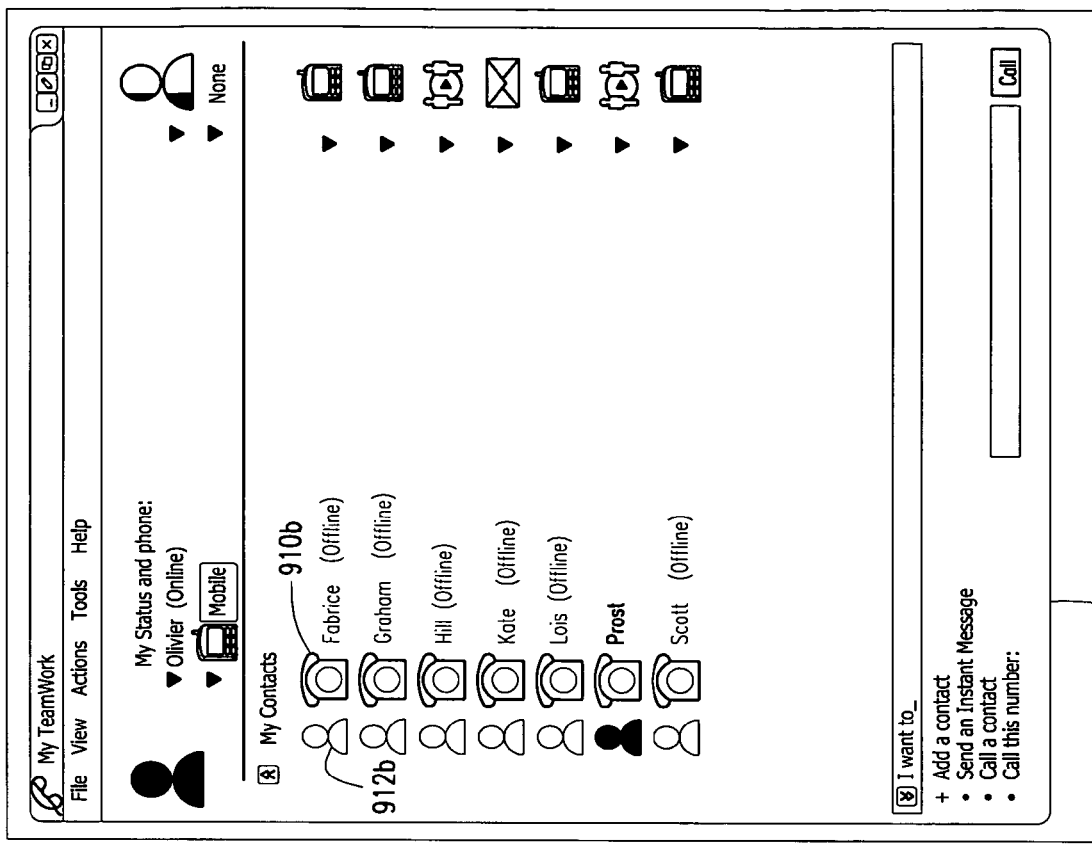
FIGS. 9A and 9B each illustrate a contact list page of one of two users each of whom is a contact of the other such that the preference level and contact VIP levels selected by each of the users affect the appearance of the contact list page of the other user in accordance with one embodiment.
Figure 9A:
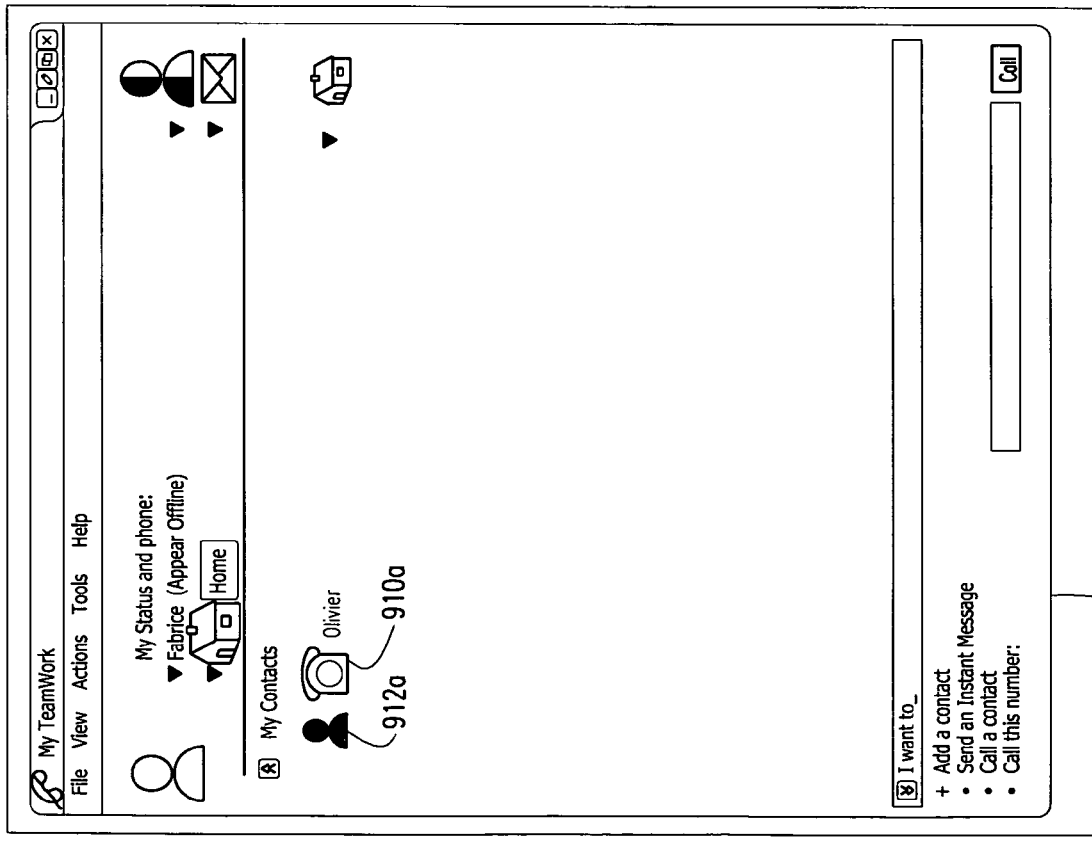

FIGS. 9A and 9B each illustrate a contact list page for one of two users, each of whom is a contact of the other. In particular, FIG. 9A illustrates a contact list page 900a for a first user "Fabrice". FIG. 9B illustrates a contact list page 900b for a second user "Olivier". For reasons described in detail above, it is apparent from the appearance of the contact list page 900a that the user Fabrice is OFFLINE and that a FMFM feature for a contact Olivier (i.e., the second user) is enabled. Similarly, it is apparent from the appearance of the contact list page 900b that the user Olivier is ONLINE and that the FMFM feature for a contact Fabrice (i.e., the first user) is enabled.

Referring to FIG. 9A, the fact that the FMFM feature for Fabrice is enabled in Olivier's contact list is reflected by the appearance of an icon 910a, which indicates to Fabrice that Olivier is available. Similarly, referring to FIG. 9B, the fact that the FMFM feature for Olivier is enabled in Fabrice's contact list is reflected by the appearance of an icon 910b, which indicates to Olivier that Fabrice is unavailable. Additionally, as illustrated in FIG. 9A, a presence icon 912a for Olivier in the contact list of Fabrice indicates that Olivier is ONLINE. Similarly, as illustrated in FIG. 9B, a presence icon 912b for Fabrice in the contact list of Olivier indicates that Fabrice is OFFLINE.

Figure 10B:
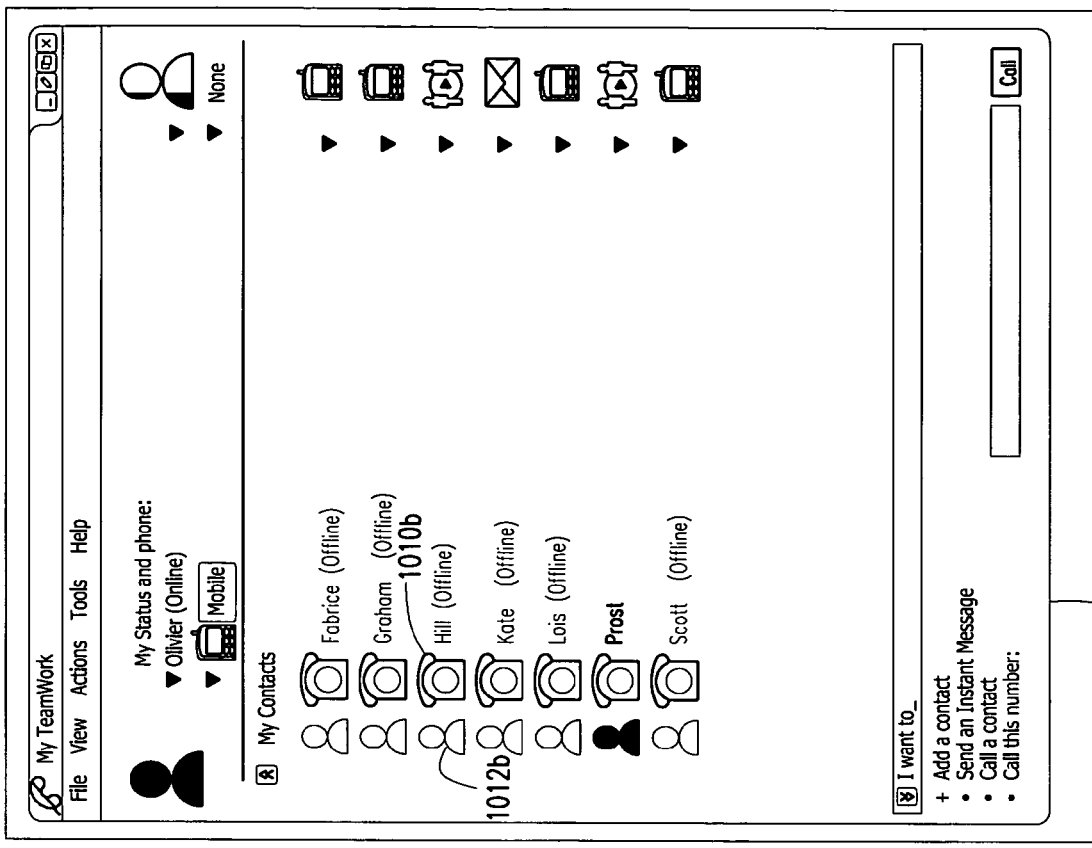
FIGS. 10A and 10B each illustrate a contact list page of one of two users each of whom is a contact of the other user such that the preference level and contact VIP levels selected by each of the users affect the appearance of the contact list page of the other user in accordance with one embodiment.
Figure 10A:
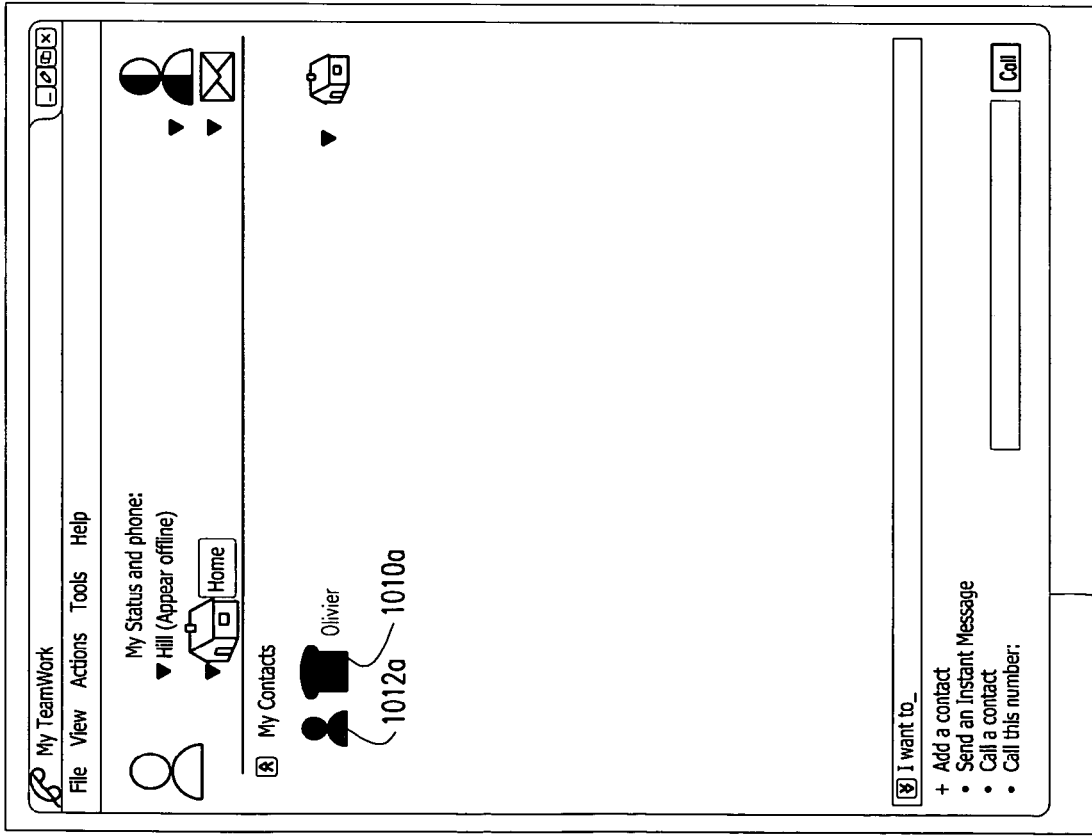

FIGS. 10A and 10B each illustrate a contact list page for one of two users, each of whom is a contact of the other. In particular, FIG. 10A illustrates a contact list page 1000a for a first user "Hill". FIG. 10B illustrates a contact list page 1000b for a second user "Olivier". For reasons described in detail above, it is apparent from the appearance of the contact list page 1000a that the user Hill is OFFLINE and that a FMFM feature for a contact Olivier (i.e., the second user) is enabled. Similarly, it is apparent from the appearance of the contact list page 1000b that the user Olivier is ONLINE and that the FMFM feature for a contact Hill (i.e., the first user) is not enabled.

Referring to FIG. 10A, the fact that the FMFM feature for Hill is not enabled in Olivier's contact list is reflected by the appearance of an icon 1010a, which indicates to Hill that Olivier is not available. Similarly, referring to FIG. 10B, the fact that the FMFM feature for Olivier is enabled in Hill's contact list is reflected by the appearance of an icon 1010b, which indicates to Olivier that Hill is available. Additionally, as illustrated in FIG. 10A, a presence icon 1012a for Olivier in the contact list of Hill indicates that Olivier is ONLINE. Similarly, as illustrated in FIG. 10B, a presence icon 1012b for Hill in the contact list of Olivier indicates that Hill is OFFLINE.

An advantage of the embodiments described herein is that the preference and policy selection of the user for each contact or contact group is constantly indicated in association with the display of the contact or contact group in the contact list. Another advantage of the embodiments described herein is that the allowed actions for each contact or contact group, in accordance with the preference and policy selection for the contact or contact group, is constantly indicated in association with the display of the contact or contact group in the contact list. As a result of the foregoing advantages, the user is more easily able to make rapid, accurate decisions in connection with communications events.

A related advantage is that the embodiments enable a user to take action quickly via a single view (i.e., the contact list page) without the need to access extra menus to set preference and policy selections.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A graphical user interface ("GUI") provided on a display device for displaying a directory of contacts of a user, the GUI comprising:
   a contact information icon representative of current contact information for the user, wherein the contact information icon is displayed in a first window of the GUI;
   a drop down menu associated with the contact information icon for setting current contact information for the user;
   a list of contacts displayed in the first window of the GUI;
   for each contact in the list of contacts, a preference and policy category for the contact, wherein the preference and policy category for the contact is displayed in the first window of the GUI; and
   for each contact in the list of contacts, a feature icon indicative of whether a feature is enabled for the contact according to the preference and policy category for the contact, wherein the feature icon is displayed in association with the contact in the first window of the GUI;
   wherein, for each of the contacts, an appearance of the feature icon associated with the contact is automatically updated in the first window of the GUI when a change in the setting of the current contact information for the user occurs;
   wherein, for each contact, an appearance of the feature icon associated with the contact is indicative of a manner in which a communications event initiated by the contact will be handled.

2. The GUI of claim 1 further comprising a user preference icon indicative of a preference level selected by the user, wherein the user preference icon is displayed in the first window of the GUI.

3. The GUI of claim 2 further comprising a drop down menu associated with the user preference icon for setting a user preference level.

4. The GUI of claim 1 wherein, for each of the contacts, if the feature for the contact is enabled, an appearance of the feature icon associated with the contact is identical to an appearance of the contact information icon.

5. The GUI of claim 1 wherein, for each of the contacts, if the feature for the contact is not enabled, an appearance of the feature icon associated with the contact is different from an appearance of the contact information icon.

6. The GUI of claim 1 further comprising:
   an exceptional cases icon displayed in the first window of the GUI, wherein the exceptional cases icon is indicative of an overflow option selected by the user; and
   a drop down menu associated with the exceptional cases icon for selecting one of a plurality of overflow options.

7. The GUI of claim 6 wherein the overflow option selected by the user dictates how an exceptional communications event will be handled.

8. The GUI of claim 1 further comprising, for each contact, a drop down menu associated with the feature icon associated with the contact for setting a VIP level of the contact.

9. The GUI of claim 1 further comprising, for each contact, a drop down menu associated with the feature icon associated with the contact for setting a VIP option of the contact, wherein the VIP option of the contact dictates a manner in which a communications event initiated by the contact will be handled in cases in which the feature associated with the contact is not enabled for the contact.

10. A method of displaying a directory of contacts of a user using a graphical user interface ("GUI"), the method comprising:
    displaying in a first window of the GUI, contact information icon representative of current contact information for the user;
    responsive to selection of a graphical display element displayed in the first window of the GUI in association with the contact information icon, displaying a drop down menu associated with the contact information icon for setting current contact information for the user;
    displaying in the first window of the GUI a list of contacts;
    for each contact in the list of contacts, displaying in the first window of the GUI a preference and policy category for the contact; and
    for each contact in the list of contacts, displaying in the first window of the GUI a feature icon indicative of whether a feature is enabled for the contact according to the preference and policy category for the contact; and
    for each contact in the list of contacts, updating an appearance of the feature icon associated with the contact in the first window of the GUI when a change in the setting of the current contact information for the user occurs;

wherein, for each contact, an appearance of the feature icon associated with the contact is indicative of a manner in which a communications event initiated by the contact will be handled.

11. The method of claim 10 further comprising displaying in a first window of the GUI a user preference icon indicative of a preference level selected by the user.

12. The method of claim 11 further comprising, responsive to selection of a graphical display element displayed in the first window of the GUI in association with the user preference icon, displaying a drop down menu associated with the user preference icon for setting a user preference level.

13. The method of claim 10 wherein, for each of the contacts, if the feature for the contact is enabled, an appearance of the feature icon associated with the contact is identical to an appearance of the contact information icon.

14. The method of claim 10 wherein, for each of the contacts, if the feature for the contact is not enabled, an appearance of the feature icon associated with the contact is different from an appearance of the contact information icon.

15. The method of claim 10 further comprising:
displaying in a first window of the GUI an exceptional cases icon, wherein the exceptional cases icon is indicative of an overflow option selected by a user; and
responsive to selection of a graphical display element displayed in the first window of the GUI in association with the exceptional cases icon, displaying a drop down menu associated with the exceptional cases icon for selecting one of a plurality of overflow options.

16. The method of claim 15 wherein the overflow option selected by the user dictates how an exceptional communications event will be handled.

17. The method of claim 10 further comprising, for each contact, responsive to selection of a graphical display element displayed in the first window of the GUI in association with the feature icon, displaying a drop down menu associated with the feature icon associated with the contact for setting a VIP level of the contact.

18. The method of claim 10 further comprising, for each contact, responsive to selection of a graphical display element displayed in the first window of the GUI in association, displaying a drop down menu associated with the feature icon associated with the contact for setting a VIP option of the contact, wherein the VIP option of the contact dictates a manner in which a communications event initiated by the contact will be handled in cases in which the feature associated with the contact is not enabled for the contact.

19. A method for organizing contact information in a directory, the method comprising:
displaying in a first window of a directory application, contact information icon representative of current contact information for a user;
responsive to selection of a graphical display element displayed in the first window of the directory application in association with the contact information icon, displaying a drop down menu associated with the contact information icon for setting current contact information for the user;
displaying a list of contacts within the first window of the directory application;
displaying for each contact a feature icon associated with a preference and policy category for the contact within the first window of the directory application;
displaying for each contact authorized actions corresponding to the preference and policy category for the contact within the first window of the directory application; and
for each contact in the list of contacts, updating an appearance of the feature icon in the first window of the directory application when a change in the setting of the current contact information for the user occurs;
wherein, for each contact, an appearance of the feature icon associated with the contact is indicative of a manner in which a communications event initiated by the contact will be handled.

20. The method of claim 19 further comprising, for each contact, selecting a VIP level for the contact via a menu associated with the feature icon associated with the contact, wherein the menu lists VIP levels available for selection for the contact.

21. The method of claim 20 further comprising displaying within the first window of the directory application a user preference icon, the user preference icon providing a visual indication of a preference level selected by the user.

22. The method of claim 21 wherein the preference level may be modified via a menu associated with the user preference icon, wherein the menu lists preference levels available for selection by the user.

23. The method of claim 22 wherein for each contact, the preference and policy category of the contact is determined by the preference level of the user and the VIP level of the contact.

* * * * *